May 17, 1932.　　　W. NÖLLENBURG　　　1,858,414
MACHINE FOR MAKING INDENTED TAPER PINS
Filed Aug. 11, 1928
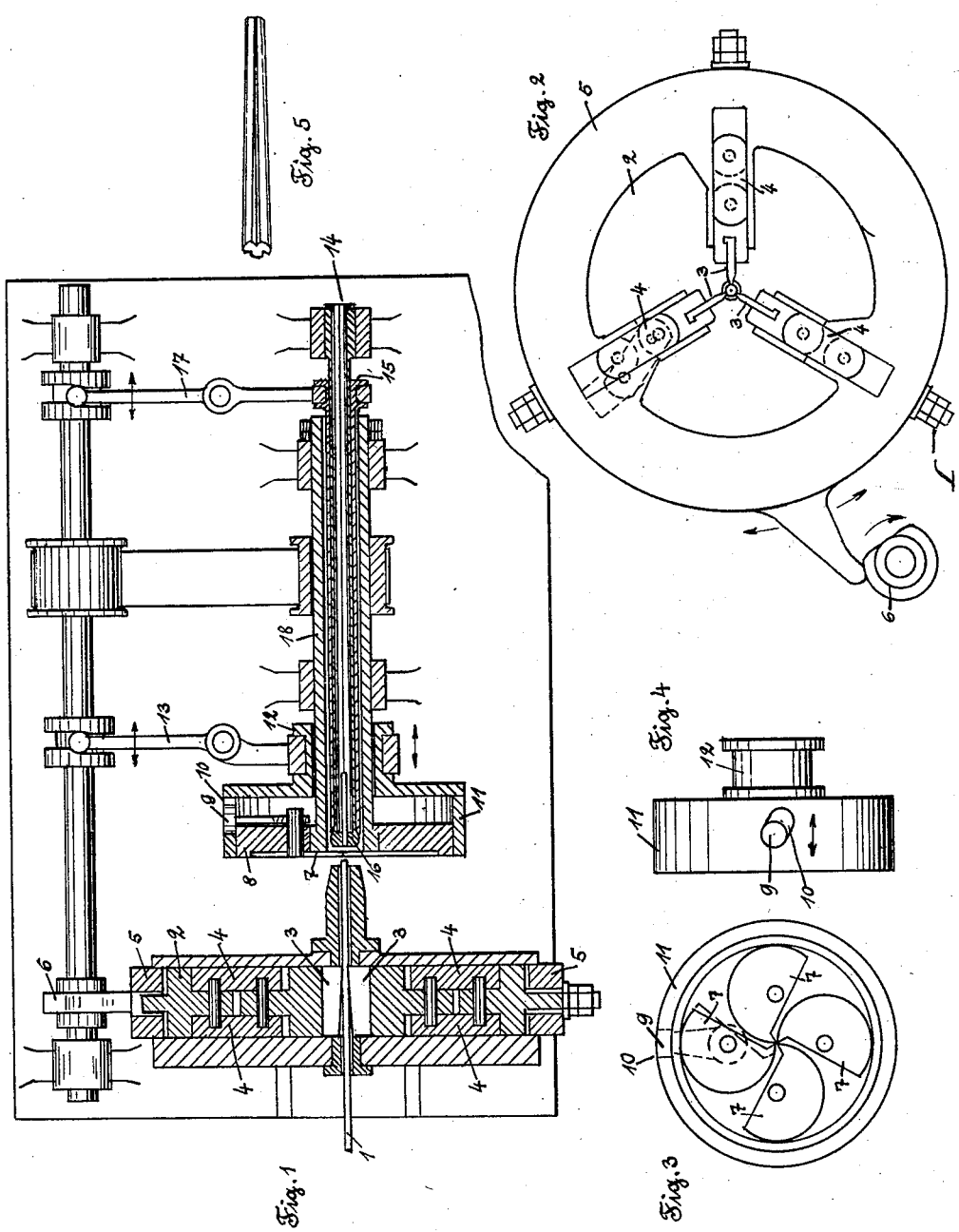
INVENTOR
W. NÖLLENBURG
BY　_____　ATTY.

Patented May 17, 1932

1,858,414

UNITED STATES PATENT OFFICE

WILHELM NÖLLENBURG, OF DUSSELDORF, GERMANY, ASSIGNOR TO THE FIRM: MAL-MEDIE & CO. MASCHINENFABRIK AKTIEN-GESELLSCHAFT, IN DUSSELDORF, GERMANY

MACHINE FOR MAKING INDENTED TAPER PINS

Application filed August 11, 1928, Serial No. 299,077, and in Germany July 20, 1927.

Instead of cylindrical and conical taper pins being applied to fasten machine parts indented taper pins lately are used. These pins are of circular or formed cross section in which indents are pressed in preferably longitudinally. The best known are such taper pins which are of circular cross section and provided with several longitudinal indents of depth increasing to the top. The pins at first being cylindrical are tapered by pressing in. These taper pins are an excellent fastening and are manufacturable more cheaply and more simply than the pins above-mentioned.

This invention relates to a method and a machine for manufacturing taper pins indented automatically from a wire. According to said invention indents are pressed in the wire by tools radially shiftable and after advancing the wire for the length of a pin its top will be worked by cutters provided on a rotating disc and capable of being swiveled for the purpose of feed, and then the pin will be sliced off. The tools radially slidable on a disc fixed are advanced for pressing in by swiveling a rim rotatory on said disc. The cutters for slicing off the pin are disposed in a circle on a rotatory disc and they are advanced by axially sliding a rim engaging with levers connected with said cutters and adapted to swivel them. The said levers are for instance in engagement with notches of the rim. At working greater pins the cutters take off small cuttings side by side, at working shorter pins the cutters work successively. This section of working operation though pretending more time than the other sections is considerably shortened by the arrangement of several cutters.

Within the hollow shaft of the rotating disc for carrying said cutters a chuck is disposed to clamp the wire being composed of a fixed and a movable pipe thereon. The outer pipe tapered at the top causes the inner pipe slitted and bulbed at the top by shifting over it to clamp the wire put therein. The chuck is arranged next to the cutters in order to prevent the wire from being distorted during the slicing operation.

In the accompanying drawings:

Fig. 1 is a longitudinal section through a machine according to this invention,

Fig. 2 is a side view showing the device for pressing in the indents,

Fig. 3 is a side view of the cutter disc,

Fig. 4 is a plan view of the feeding device for the cutters

Fig. 5 represents a taper pin longitudinally indented.

The wire 1 which is to be worked is put in the machine from the left and at first it is provided with indents pressed in by tools 3 radially shiftable in a fixed disc 2. The tools 3 are caused to be fed by levers 4 jointed with a rim 5 rotatory on the disc 2. The rotating movement of the rim 5 may be effected by a rack or a cam 6 moved by a shaft of the machine.

The cutters 7 provided to work the top of the pin and to slice off the pin are arranged rotary four in a circle on a rotating disc 8. Each cutter 7 is provided with a lever 9 engaging with a notch 10 of the rim 11. The rim 11 fixed with a box 12 is caused by a lever 13, which is moved by a grooved disc, to be shifted axially thereby effecting the feed motion of the rotary cutters 7.

The chuck for clamping the wire during the working operation of the cutters is arranged within a hollow shaft 18 of the cutter disc 8 and consists of two pipes 14 and 15. The fixed inner pipe 14 is slitted and bulbed (16) at the top. The outer pipe 15 is tapered at the top and is caused by the lever 17 to be moved axially. The bulb 16 of the pipe 14 is thereby compressed and forced to clamp the wire 1. At the right end of the pipe 14 the taper pins ready are thrown out. The top of the chuck is arranged next to the cutters 7 in order to prevent the wire from being distorted during the working operation by the cutters.

Fig. 5 represents a taper pin with longitudinal indents of increasing depth to the top.

What I claim is:

1. In a machine for automatically making indented taper pins from wire, means for supporting a wire length, means for forming the wire including a series of radially movable tools encircling the wire, said tools being of chisel form and acting to longitudinally indent the wire, a ring mounted for rotary reciprocatory movement, means for operating the ring, and means intermediate the ring and said tools whereby in the movement of the ring the tools are forced into operative engagement with the wire, and means for severing the wire into appropriate lengths immediately following the operation of the forming means.

2. In a machine for automatically making indented taper pins from a wire, a tool carrier, means for supporting the wire transversely of the tool carrier, means for forming the wire including a series of chisel-like tools arranged concentric with the wire and slidable in the tool carrier, a ring supported by the tool carrier and mounted for rotary reciprocation, and means intermediate the ring and tools for converting the rotary reciprocatory movement of the ring into radial movement of the tools for operation on the wire, and severing means arranged at the point of exit of the wire from the forming means for severing the wire into taper pin lengths.

3. In a machine for automatically making indented taper pins from a wire, a tool carrier, means for supporting the wire transversely of the tool carrier, means for forming the wire including a series of chisel-like tools arranged concentric with the wire and slidable in the tool carrier, a ring supported by the tool carrier and mounted for rotary reciprocation, and means intermediate the ring and tools for converting the rotary reciprocatory movement of the ring into radial movement of the tools for operation on the wire, each of said tools including a chisel edge, the cutting plane of which is at an angle to the axial plane of the wire, and severing means arranged at the point of exit of the wire from the forming means for severing the wire into taper pin lengths.

4. In a machine for forming automatically indented taper pins from a wire, a cutter for severing the wire into taper pin lengths including a driven ring concentric with the wire, a plurality of tools carried by the ring and mounted for rotary movement with respect to the ring to engage and cut the wire, a lever connected to each tool, and an element mounted for reciprocation axially of the wire and formed with slots to receive and operate the levers in the reciprocation of the element to thereby rock the cutters into and out of cutting relation with respect to the wire.

In testimony whereof I have affixed my signature.

WILHELM NÖLLENBURG.